United States Patent [19]
Leveque

[11] Patent Number: 5,495,468
[45] Date of Patent: Feb. 27, 1996

[54] SYSTEM AND METHOD FOR TRANSMITTING PLURAL INFORMATION WAVEFORMS OVER A SINGLE COMMUNICATIONS CHANNEL USING LINCOMPEX TECHNIQUES

[75] Inventor: J. Howard Leveque, Columbia, Md.

[73] Assignee: LinkPlus Corporation, Columbia, Md.

[21] Appl. No.: 258,060

[22] Filed: Jun. 10, 1994

[51] Int. Cl.⁶ .................................. H04B 1/64; H04J 3/18
[52] U.S. Cl. ............................ 370/7; 370/69.1; 370/74; 370/110.4; 455/72; 333/14; 333/16
[58] Field of Search ............................ 370/110.1, 110.4, 370/111, 7, 120, 112, 69.1, 12, 19, 20, 21, 74, 122, 123, 95.1, 110.3, 110.2; 375/260, 261, 237, 238, 239, 340, 359; 455/102, 72, 39, 42, 43, 68; 333/14, 16

[56] References Cited

U.S. PATENT DOCUMENTS

| | | | |
|---|---|---|---|
| 4,271,499 | 6/1981 | Leveque | 370/7 |
| 4,347,616 | 8/1982 | Murakami | 370/20 |
| 4,512,013 | 4/1985 | Nash et al. | 370/118 |
| 4,907,217 | 3/1990 | Leveque | 370/7 |
| 5,058,202 | 10/1991 | Leveque | 455/43 |
| 5,280,537 | 1/1994 | Sugiyama et al. | 370/110.4 |
| 5,355,101 | 10/1994 | Ichihara et al. | 375/261 |

*Primary Examiner*—Alpus Hsu
*Assistant Examiner*—Ricky Ngo

[57] ABSTRACT

At least two information waveforms are transmitted over the same communications channel using Lincompex techniques. Each of the information waveforms are modulated using Lincompex techniques to generate compressed information waveforms and associated control tones. The compressed information waveforms have the same frequency band. The compressed information waveforms and associated control tones are arithmetically combined, and transmitted over a transmission medium. These signals are then received from the transmission medium. A plurality of Lincompex expanders demodulate the received signals using Lincompex techniques and one of the associated control tones.

28 Claims, 8 Drawing Sheets

SYSTEM AND METHOD FOR TRANSMITTING PLURAL INFORMATION WAVEFORMS OVER A SINGLE COMMUNICATIONS CHANNEL USING LINCOMPEX TECHNIQUES

FIELD OF THE INVENTION

The present invention relates to a system and method for transmitting a plurality of information waveforms over a single communications channel using Lincompex (linked compressor-expander) techniques.

BACKGROUND OF THE INVENTION

Lincompex systems are well known in the telecommunications art. Such a digital Lincompex system is taught in U.S. Pat. No. 4,271,499 (the "'499 patent") entitled "Method and Apparatus for Digitally Implementing a Linked Compressor-Expander Telecommunications System" which issued Jun. 2, 1981, to Leveque, the Inventor of the present application. The '499 patent only teaches the transmitting of a voice signal over a Lincompex system. However, it has also been found that Lincompex systems can be utilized to transmit data having a complex waveform. Such a system that overcomes the inherent problem of data and envelope overlap (i.e., complex waveform) is fully disclosed in U.S. Pat. No. 4,907,217 (the "'217 patent"), also to Leveque, issued on Mar. 6, 1990, entitled "System and Method of Transmitting A Complex Waveform Over a Communication Channel Utilizing Lincompex Techniques".

In the voice transmission system, as disclosed in the '499 patent, a voice signal is transmitted using Lincompex techniques. This voice signal is band limited and exhibits a control tone 4 (according to the teachings of the '499 patent) which is also band limited and does not overlap the voice band 2, (see FIG. 2(a)).

Figure 1A:
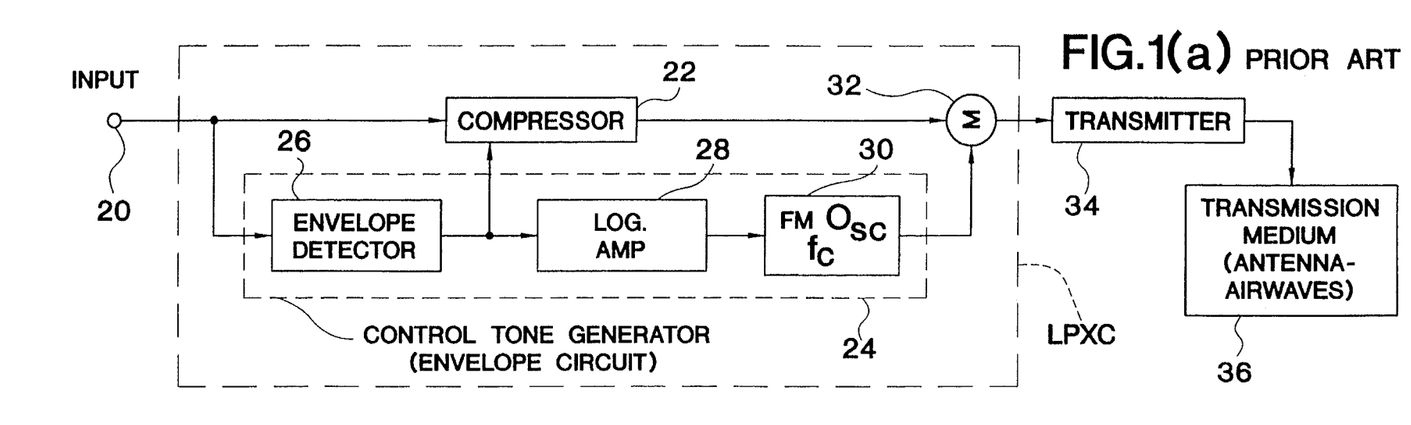
FIGS. 1(a) and 1(b) illustrate a prior art Lincompex modulator and demodulator.
Figure 1B:
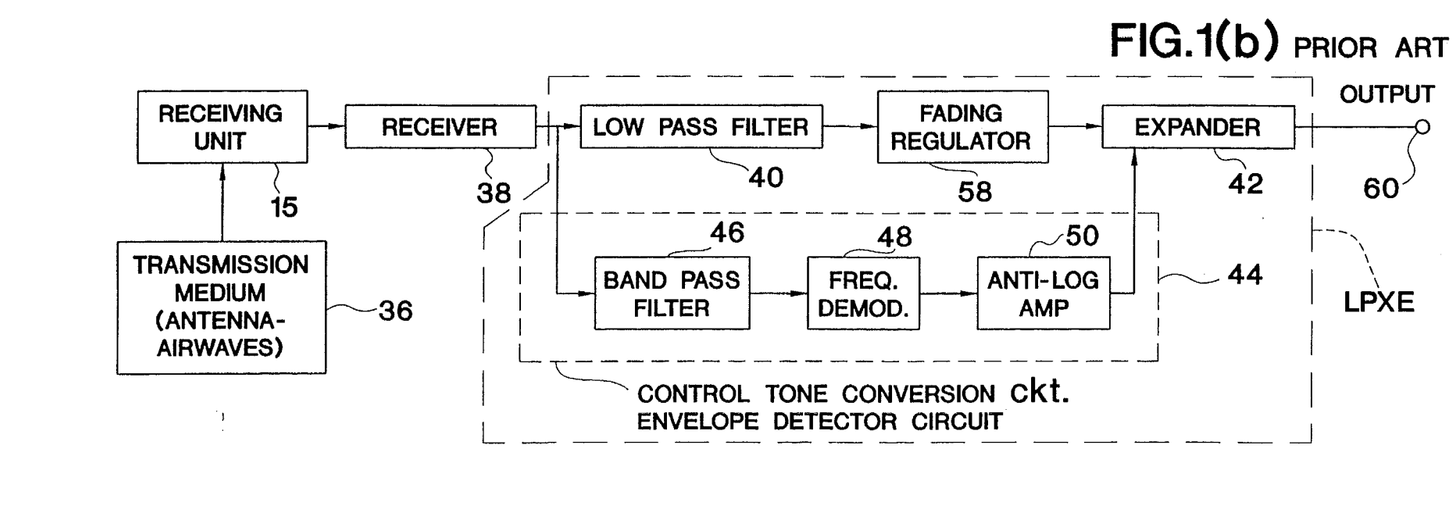

FIGS. 1(a) and 1(b) illustrates the Lincompex System of the '499 patent.

In the modulator of FIG. 1(a) an input 20 of the Lincompex system modulator receives voice information for transmission. A control tone generator or envelope circuit 24 monitors the input voice signal. A compressor 22 compresses the introduced input voice signal. Compression is performed by dividing the signal by its envelope in pseudo-real time to produce a compressed voice signal. To develop the control tone, the system of FIG. 1(a) supplies the envelope signal developed from the output of the envelope detector 26 to a logarithmic (log) amplifier 28 which then develops a signal representative of the logarithm of the envelope signal. The output of this logarithmic amplifier 28 is supplied to a control terminal of a voltage control FM oscillator 30, which generates a frequency that varies about a center frequency $F_c$ in relation to the variation of the input voltage supplied to its control terminal from the logarithmic amplifier 28, to develop an envelope signal as an output of the control tone generator (envelope circuit) 24.

A summer 32 then sums the compressed voice signal developed at the output of the compressor 22 with the control tone developed at the output of the FM oscillator 30 to form a combined information signal. The summer 32, compressor 22 and control tone generator 24 form a Lincompex compressor LPXC.

In this speech transmission system, the combined information signal output from the summer 32 is provided to a transmitter 34 which transmits the signal over a desired transmission medium 36. In a typical embodiment, a single side band transmitter would normally transmit the modulated combined information signal across the airways in a known manner.

As illustrated in FIG. 1(b), the prior art Lincompex demodulator includes a receiving unit 15 which receives a modulated combined information signal from the transmission medium 36, which normally includes an antenna for receiving radio waves from the atmosphere, and supplies the received modulated combined information signal to a receiver 38. The receiver 38 demodulates the transmitted signal to produce a demodulated version of the combined information signal. Typically, this receiver 38 would be a single side band receiver which mixes the received modulated combined information signal with the channel frequency to produce a base band combined information signal.

Figure 2A:
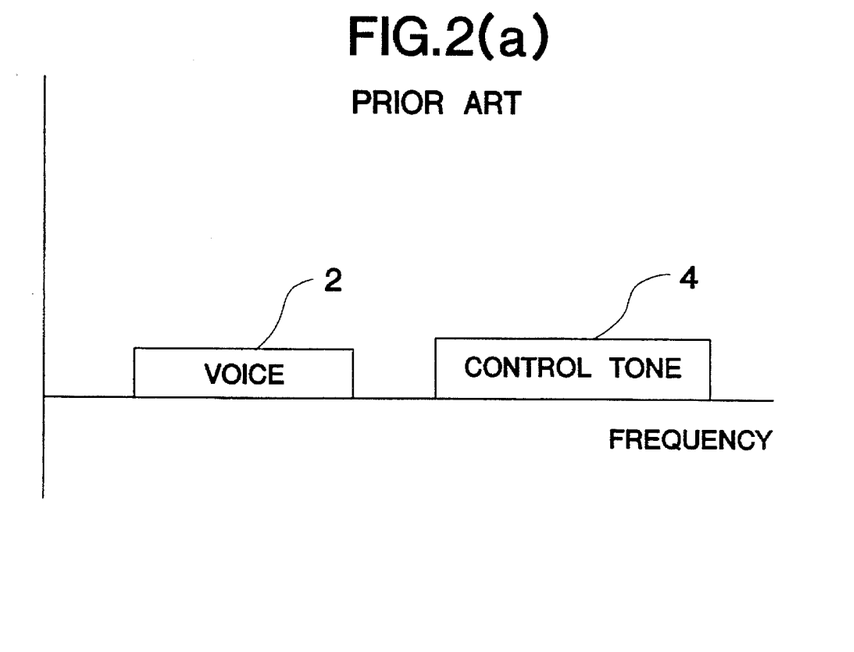
FIGS. 2(a) and 2(b) illustrate typical relationships between the frequency band of typical human voice and the control tone of this voice, and that which may be encountered by typical data and the frequency band of this data's control tone.
Figure 2B:
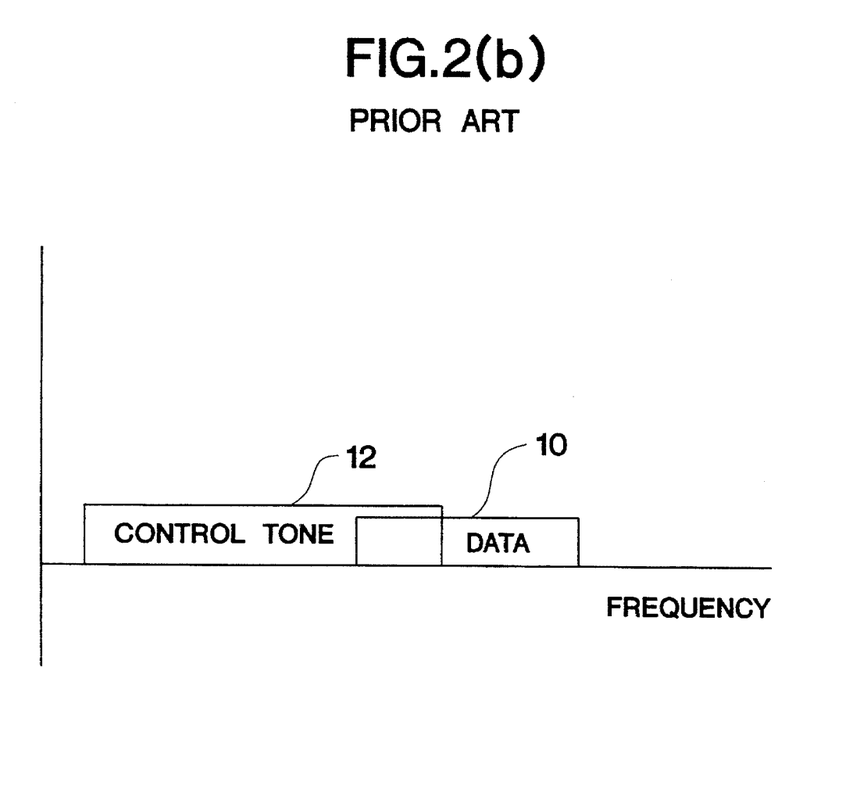

To recover only the voice signal from such a combined voice/envelope information signal, a low pass filter 40 removes the voice information 2 of FIG. 2(a) from the combined information signal to recover the compressed voice signal containing only the voice information 2. This compressed voice signal is transmitted according to the Lincompex techniques at a substantially complete modulation of the transmitter 34 of FIG. 1(a). The compressed voice signal is passed through a fading regulator 58. The fading regulator 58 is a fading regulator similar to the one described in the '499 patent which removes any audio level variations not removed by the automatic gain control circuitry in the receiver 38. This compressed modified voice signal output from the fading regulator 58 is then expanded to produce the necessary dynamic range for the recovered voice signal to be supplied at the output 60.

Accordingly, an expander 42, similar to the one described in the '499 patent, is utilized which essentially multiplies the compressed modified voice signal developed at the output of the fading regulator 58 by an envelope signal which is recovered by a control tone conversion circuit 44.

The control tone conversion circuit 44 comprises a band pass filter 46 which recovers only the control tone which is represented by the control tone information signal 4 in FIG. 2(a). The control tone originally developed by the FM oscillator 30 of FIG. 1(a) is then passed through a frequency discriminator 48. The frequency discriminator 48 measures the instantaneous frequency of the control tone and produces a voltage level representative of this measured frequency. In this case, the voltage level also represents the logarithm of the original envelope signal. The anti-logarithm circuit 50 is utilized to recover the original envelope signal. This logarithmic signal is then supplied to an anti-logarithm circuit 50. The anti-logarithm circuit 50 is utilized to recover the original envelope developed by the envelope detector 26 of FIG. 1(a). This original envelope signal is used by the expander 42 to recover the original voice signal by expanding the compressed voice signal to provide the original signal to the output 60. This control tone conversion circuit 44 is similar to the control tone conversion circuit described in the '499 patent. The control tone conversion circuit 44, low pass filter 40, fading regulator 58, and expander 42 form a Lincompex expander LPXE.

With respect to the transmission of data, the Lincompex techniques used may or may not be different from the transmission of voice signals due to the complex nature of the data waveform. This technique is fully discussed in the '217 patent.

The above described Lincompex systems have been described with respect to single side band transmission and reception. However, it has also been found that Lincompex signals can be transmitted and received utilizing frequency modulation. Such a system is fully disclosed in U.S. Pat. No. 5,058,202 (the "'202 patent"), also to Leveque, issued on Oct. 15, 1991, entitled "System and Method of Transmitting And Receiving A Lincompex Modulated Signal Over A Communication Channel Utilizing Frequency Modulation Techniques".

SUMMARY OF THE INVENTION

An object of the present invention is to provide a system and method for transmitting a plurality of information waveforms over single communications channel.

Another object of the present invention is to provide a system and method for selecting which of a plurality of receivers can demodulate a transmitted information waveform and/or information waveforms which can be demodulated.

Another object of the present invention is to provide a system and method for selecting which of a plurality of transmitted waveforms to demodulate.

These and other related objectives are achieved by providing a method for transmitting and receiving information waveforms over a communication medium, comprising the steps of:

(a) modulating a first information waveform according to Lincompex techniques to generate a first compressed information waveform having an information waveform frequency band and a first control tone having a first control tone frequency band;

(b) modulating at least a second information waveform according to Lincompex techniques to generate at least a second compressed information waveform having said information waveform frequency band and a second control tone having a second control tone frequency band;

(c) combining said first compressed information waveform and said first control tone with said second information waveform and said second control tone;

(d) transmitting output of said step (c) on a transmission medium;

(e) receiving output of said step (d) from said transmission medium; and (f) demodulating output of said step (e) according to Lincompex techniques using one of said first control tone and said second control tone.

These and other related objectives are further achieved by providing an apparatus for transmitting and receiving information waveforms over a communication medium, comprising:

a first Lincompex compressor modulating a first information waveform according to Lincompex techniques to generate a first compressed information waveform having an information waveform frequency band and a first control tone having a first control tone frequency band;

at least a second Lincompex compressor modulating at least a second information waveform according to Lincompex techniques to generate at least a second compressed information waveform having said information waveform frequency band and a second control tone having another control tone frequency band;

an arithmetic unit for arithmetically combining said first compressed information waveform and said first control tone with said second information waveform and said second control tone;

a transmitter transmitting output of said arithmetic unit on a transmission medium;

a receiver receiving output of said transmitter from said transmission medium; and at least one Lincompex expander demodulating output of said receiver according to Lincompex techniques using one of said first control tone and said second control tone.

These and other related objectives of the present invention will become more readily apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description hereinbelow and the accompanying drawings which are given by way of illustration only, and thus do not limit the present invention.

DETAILED DESCRIPTION OF THE PREFERRED EMBODIMENTS

The present invention will be described with reference to a general description of Lincompex techniques which may be implemented digitally or otherwise. The preferred embodiments contemplate the use of digital Lincompex techniques to practice that teachings of the present invention. Accordingly, to the extent necessary, applicant hereby incorporates by reference the entirety of the disclosure of U.S. Pat. No. 4,271,499 entitled "Method and Apparatus for Digitally Implementing a Linked Compressor-Expander Telecommunications System" invented by the Inventor of the present application; the entirety of the disclosure of U.S. Pat. No. 4,907,217 entitled "System and Method of Transmitting A Complex Waveform Over a Communication Channel Utilizing Lincompex Techniques" invented by the Inventor of the present application; and the entirety of disclosure of U.S. Pat. No. 5,058,202 (the "'202 patent"), entitled "System and Method of Transmitting And Receiving A Lincompex Modulated Signal Over A Communication Channel Utilizing Frequency Modulation Techniques" also invented by the inventor of the present application into the specification of the present application.

Figure 3:
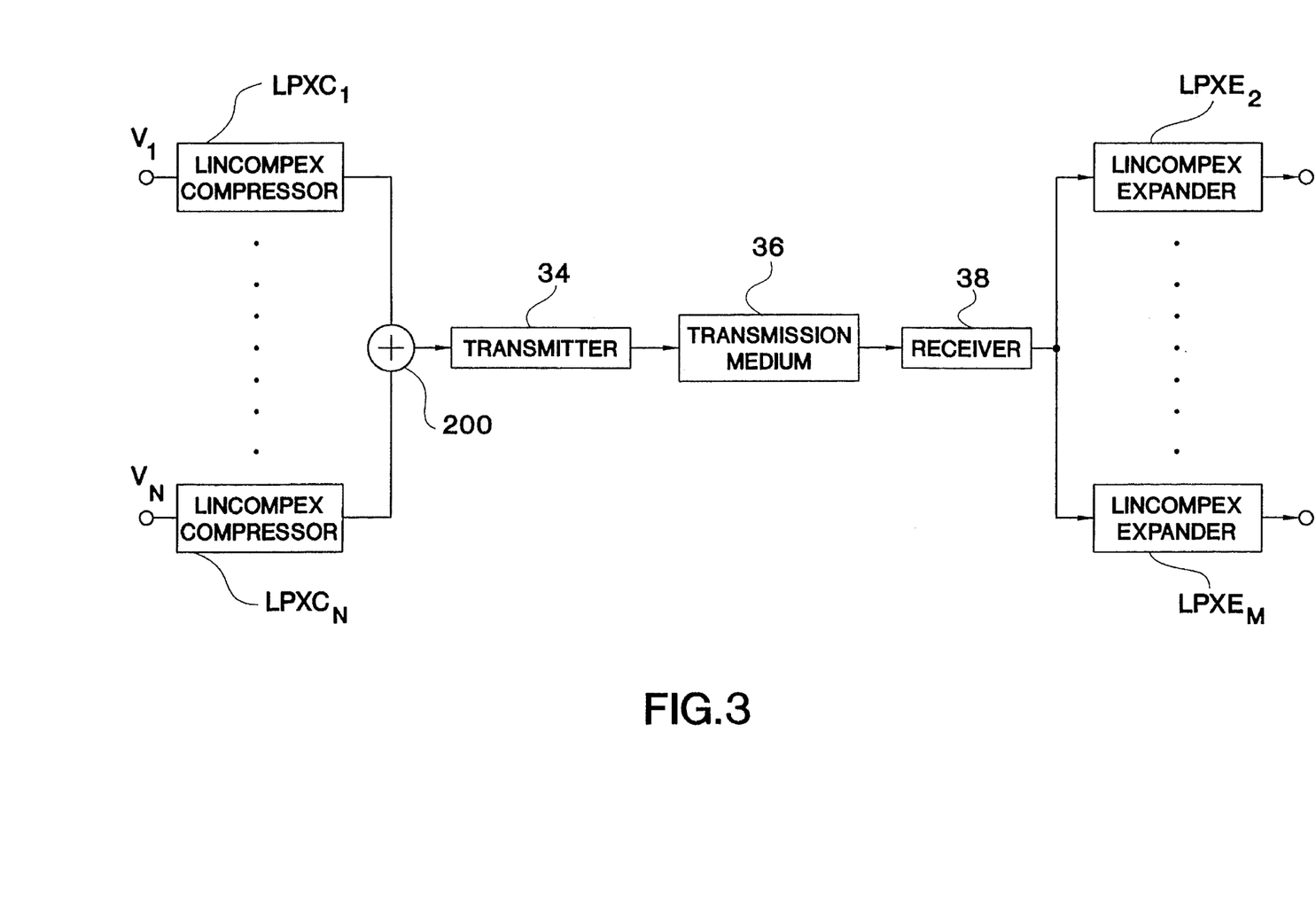
FIG. 3 illustrates a first embodiment of the present invention for transmitting a plurality of information waveforms over a single communications channel using Lincompex techniques.

FIG. 3 illustrates a first embodiment of the present invention. A plurality of voice signals $V_1, \ldots, V_N$ are input to corresponding Lincompex compressors $LPXC_1, \ldots, LPXC_N$, where N is an integer greater than or equal to two. The value of N will be discussed in detail below in the description of the operation of the present invention. Each of Lincompex compressors $LPXC_1, \ldots, LPXC_N$ is constructed as illustrated in prior art Fig. 1(a), and a description thereof will not be repeated.

The Lincompex compressors $LPXC_1, \ldots, LPXC_N$ produce compressed voice signals $CV_1, \ldots, CV_N$ and control tones $CT_1, \ldots, CT_N$, respectively. Each compressed voice signal $CV_1, \ldots, CV_N$ has the same frequency band. The frequency band of control tones $CT_1, \ldots, CT_N$ are different from the frequency band of the compressed voice signals, and do not overlap the frequency band of the compressed voice signals. Furthermore, the frequency band of each control tone differs from the frequency bands of the other control tones, and does not overlap the frequency bands of the other control tones. FIGS. 5(a)–5(d) illustrate the frequency spectrums, and thus the frequency bands, of the compressed voice signals and control tones according to the present invention, and will be described in detail below along with the operation of the present invention.

An adder 200 adds the compressed voice signals $CV_1, \ldots, CV_N$ and control tones $CT_1, \ldots, CT_N$, and the transmitter 34 transmits the output of adder 200 on transmission medium 36. The adder 200 may also be any other arithmetic unit for combining the compressed voice signals $CV_1, \ldots, CV_N$ and control tones $CT_1, \ldots, CT_N$. The transmission medium 36 utilized in the present invention may be any type of transmission medium for example, an atmospheric radio wavelength, a telephone line, coaxial cable or fiber optic cable, or any other path usable for the transmission of the selected combination information waveform such as voice or data. Also, the components of the information waveform can be sent via separate transmission mediums.

A receiver 38 receives the compressed voice signals $CV_1, \ldots, CV_N$ and control tones $CT_1, \ldots, CT_N$ from the transmission medium. As discussed with respect to prior art FIG. 1(b), the compressed voice signals $CV_1, \ldots, CV_N$ and control tones $CT_1, \ldots, CT_N$ may be initially received by a receiving unit 15.

Lincompex expanders $LPXE_1, \ldots, LPXE_M$, where M is an integer equal to or greater than 1, input the compressed voice signals $CV_1, \ldots, CV_N$ and control tones $CT_1, \ldots, CT_N$ received by receiver 38. As indicated by the possible values of M, there may be only a single Lincompex expander or several. Furthermore, the number of Lincompex expanders can be greater than, equal to, or less than the number of Lincompex compressors. Each of the Lincompex expanders $LPXE_1, \ldots, LPXE_M$ expands the compressed voice signals $CV_1, \ldots, CV_N$ according to one of the control tones $CT_1, \ldots, CT_N$. In other words, the band pass filter 46 of each of the Lincompex expanders $LPXE_1, \ldots, LPXE_M$ filters out all but a desired one of the control tones $CT_1, \ldots, CT_N$. The operation of the present invention will be described in more detail below.

Figure 4:
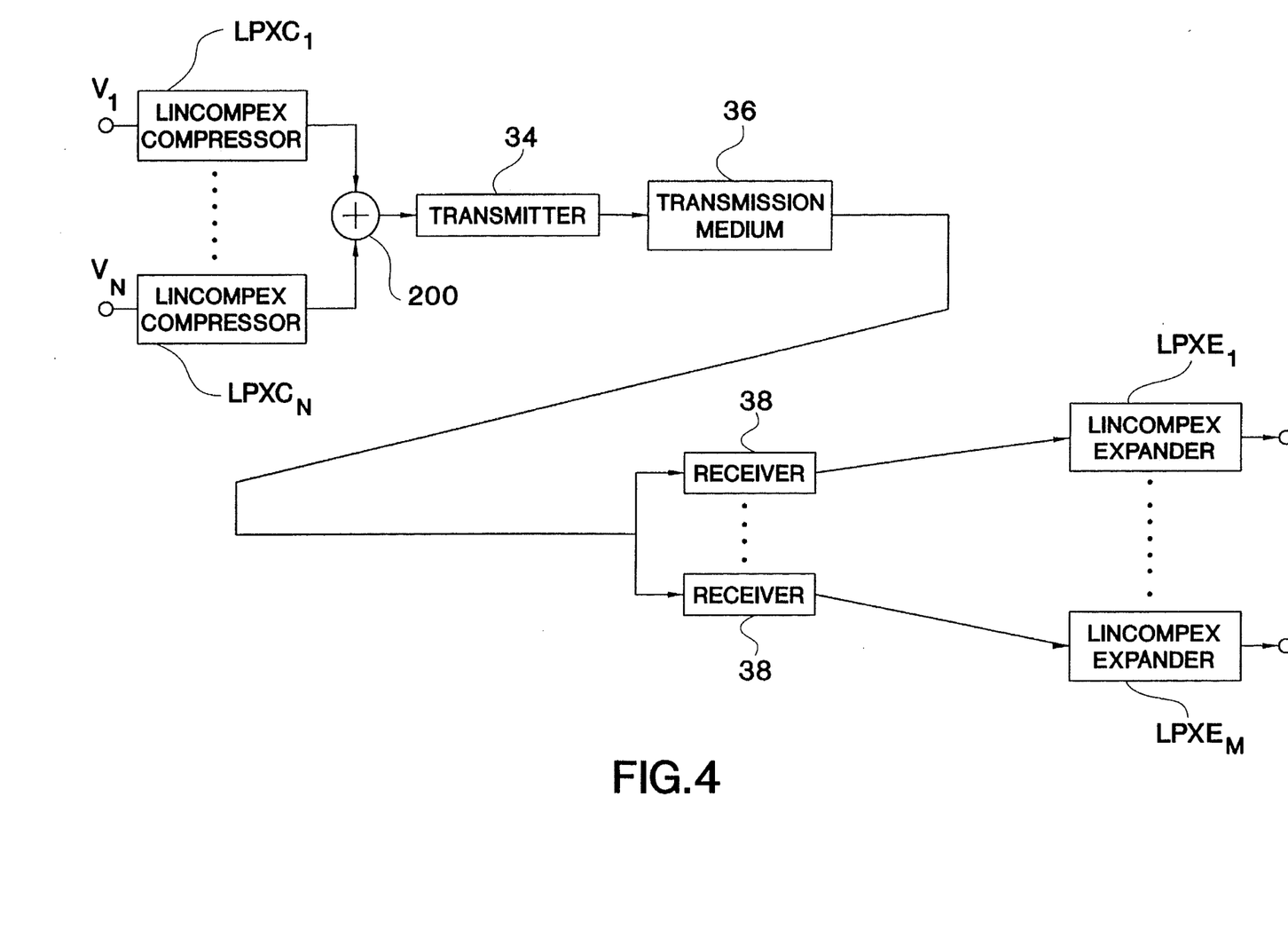
FIG. 4 illustrates another embodiment of the present invention.

FIG. 4 illustrates another embodiment of the present invention. The embodiment of FIG. 4 is similar to the embodiment of FIG. 3 discussed above. The embodiment of FIG. 4 differs from FIG. 3 in that M receivers 38 corresponding to the Lincompex expanders $LPXE_1, \ldots, LPXE_M$ receive the compressed voice signals $CV_1, \ldots, CV_N$ and control tones $CT_1, \ldots, CT_N$ from the transmission medium 36. Each of the receivers 38 is connected to a corresponding one of the Lincompex expanders $LPXE_1, \ldots, LPXE_M$, instead of a single receiver 38 connected to the Lincompex expanders $LPXE_1, \ldots, LPXE_M$ as in FIG. 3. As discussed above and shown in prior art FIG. 1(b), M receiving units 15 may be connected to the M receivers 38, respectively, to initially receive the compressed voice signals $CV_1, \ldots, CV_N$ and control tones $CT_1, \ldots, CT_N$. The remainder of the embodiment shown in FIG. 4 is as in FIG. 3, and, therefore, the description thereof will not be repeated.

Figure 6:
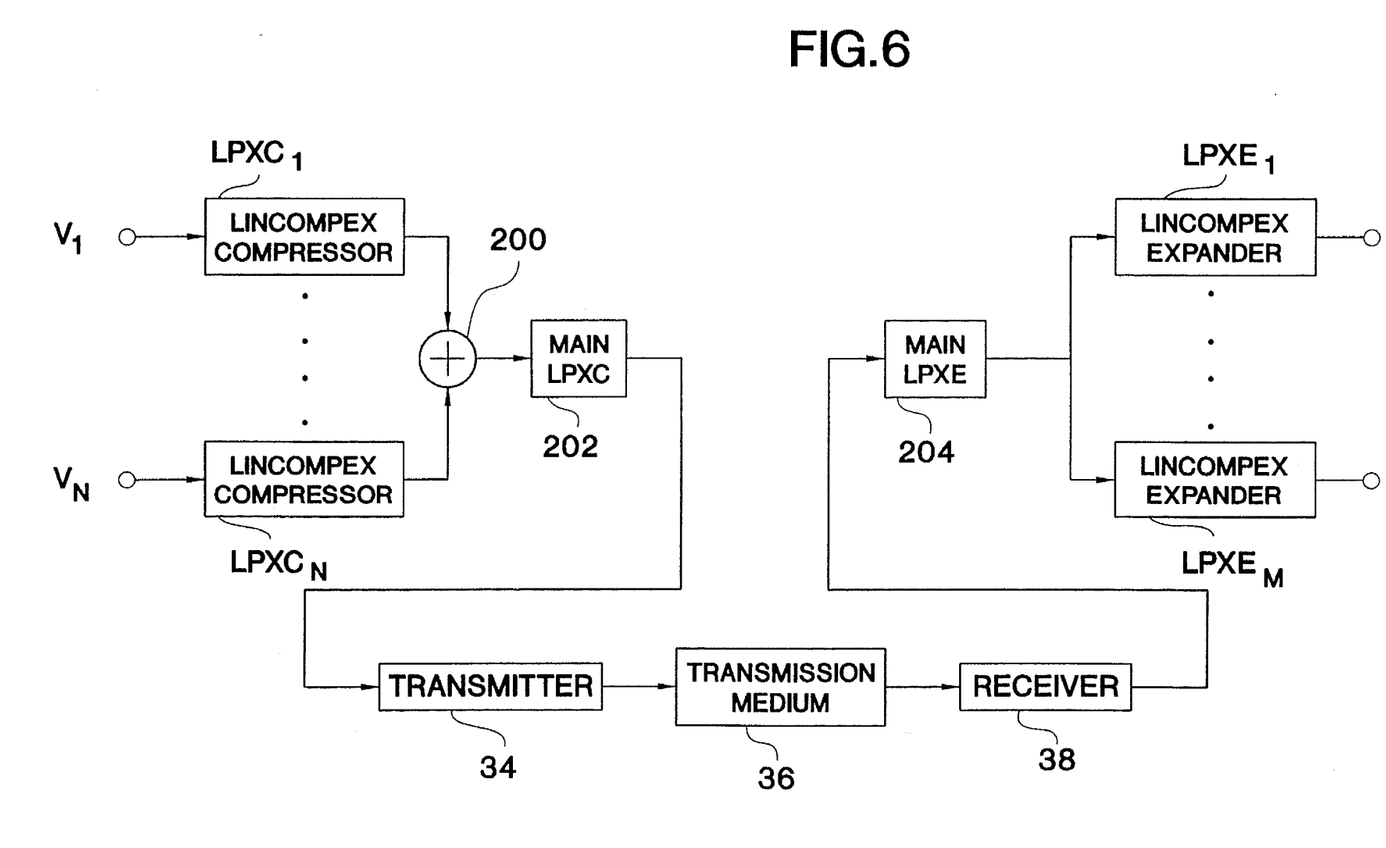
FIGS. 6–8 illustrate other embodiments of the present invention.

FIG. 6 illustrates another embodiment of the present invention similar to the embodiment of FIG. 3. The embodiment of FIG. 6 differs from the embodiment of FIG. 3 in that a main LPXC 202 is connected between adder 200 and transmitter 34, and a main LPXE 204 is connected between receiver 38 and the Lincompex expanders $LPXE_1, \ldots, LPXE_M$. As discussed above and shown in prior art FIG. 1(b), a receiving unit 15 may be connected to the receiver 38 to initially receive the compressed voice signals $CV_1, \ldots, CV_N$ and control tones $CT_1, \ldots, CT_N$. Operation of this embodiment will be described in detail below.

Figure 7:
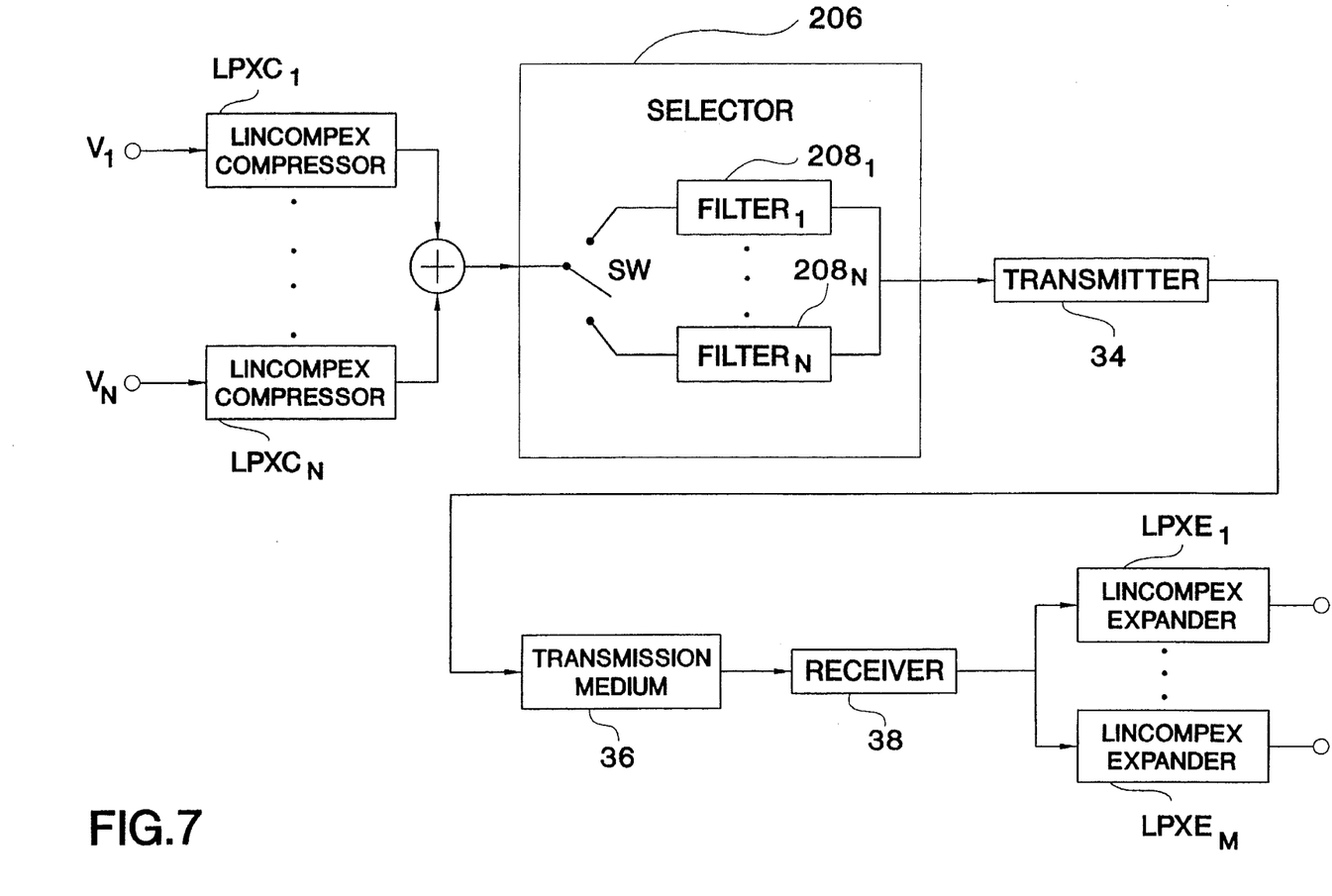

FIG. 7 illustrates another embodiment of the present invention similar to the embodiment of FIG. 3. The embodiment of FIG. 7 differs from the embodiment of FIG. 3 in that a selector 206 is connected between the adder 200 and the transmitter 34. The selector includes a switch SW and filters $208_1$-$208_N$. The switch SW connects the output of the adder 200 to one of filters $208_1$-$208_N$. The filters $208_1$-$208_N$ correspond to control tones $CT_1, \ldots, CT_N$, respectively, and filter out the control tones which do not correspond. For instance, filter $208_1$ corresponding to control tone $CT_1$ outputs the compressed voice signals $CV_1, \ldots, CV_N$ and control tone $CT_1$.

As discussed above and shown in prior art FIG. 1(b), a receiving unit 15 may be connected to the receiver 38 to initially receive the compressed voice signals $CV_1, \ldots, CV_N$ and control tones $CT_1, \ldots, CT_N$. Additionally, as shown in FIG. 4, a plurality of receivers 38, each corresponding to one of the Lincompex expanders $LPXE_1, \ldots, LPXE_M$, may be used. Also, a main LPXC 202 and main LPXE 204 as described in FIG. 6 may be used in the embodiment of FIG. 7. The operation of this embodiment will be described in detail below.

Figure 8:
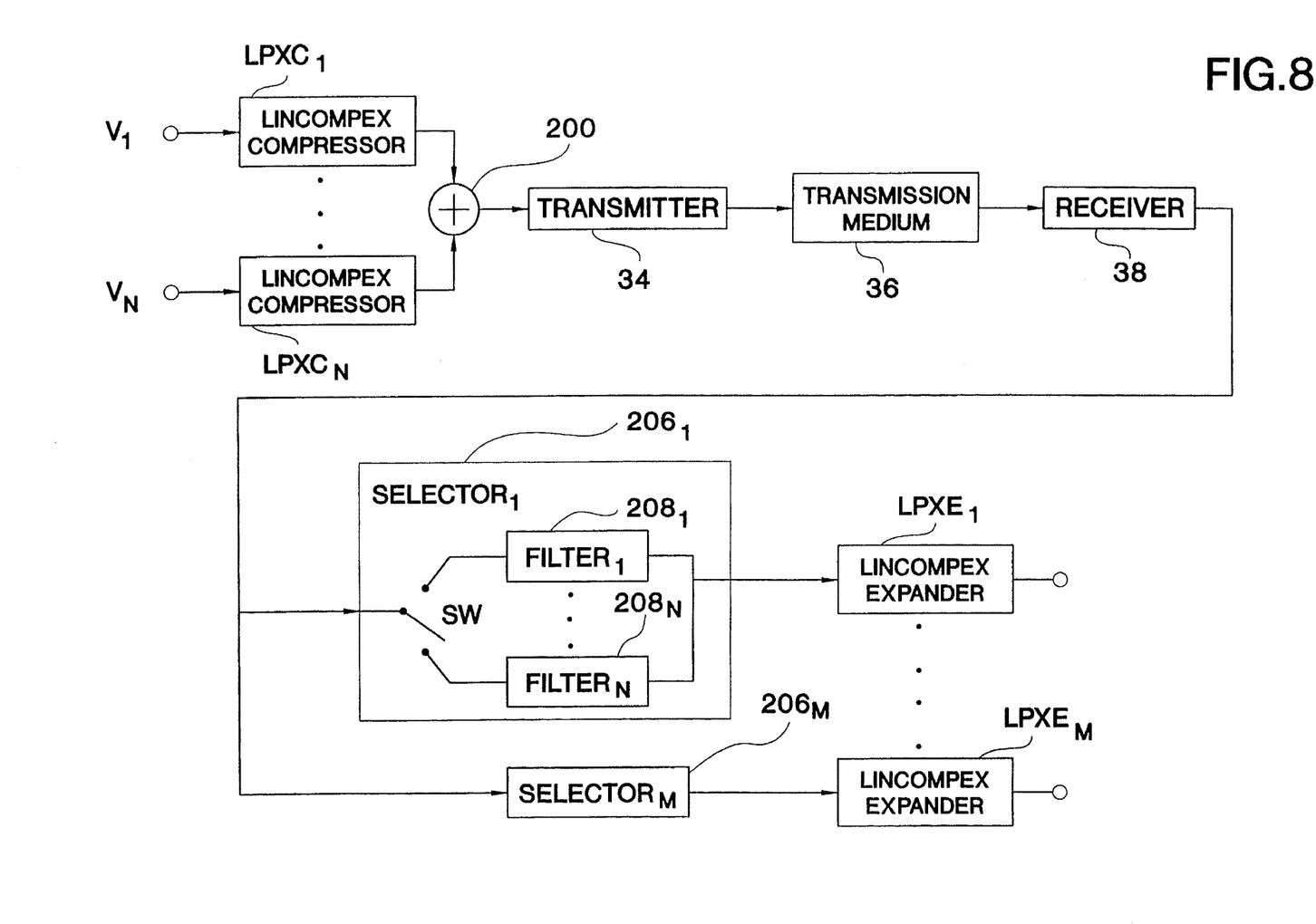

FIG. 8 illustrates another embodiment of the present invention similar to the embodiment of FIG. 3. The embodiment of FIG. 8 differs from the embodiment of FIG. 3 in that selectors $206_1$-$206_M$ are connected between the receiver 38 and the Lincompex expanders $LPXE_1, \ldots, LPXE_M$, respectively. Each of selectors $206_1$-$206_M$ includes a switch SW and filters $208_1$-$208_N$. The switch SW connects the output of the receiver 38 to one of filters $208_1$-$208_N$. The filters $208_1$-$208_N$ correspond to control tones $CT_1, \ldots, CT_N$, respectively, and filter out the control tones which do not correspond. For instance, filter $208_1$ corresponding to control tone $CT_1$ outputs the compressed voice signals $CV_1, \ldots, CV_N$ and control tone $CT_1$. It should be understood that, in this embodiment, the band pass filters 46 of the Lincompex expanders $LPXE_1, \ldots, LPXE_M$ operate to pass all possible control tones, and only filter out the compressed voice signals $CV_1, \ldots, CV_N$.

As discussed above and shown in prior art FIG. 1(b), a receiving unit 15 may be connected to the receiver 38 to initially receive the compressed voice signals $CV_1, \ldots, CV_N$ and control tones $CT_1, \ldots, CT_N$. Additionally, as shown in FIG. 4, a plurality of receivers 38, each corresponding to one of the Lincompex expanders $LPXE_1, \ldots, LPXE_M$, may be used. Also, a main LPXC 202 and main LPXE 204 as described in FIG. 6 may be used in the embodiment of FIG. 8.

As a further variation, the selectors $206_1$-$206_M$ may replace the band pass filters 46 in the corresponding Lincompex expanders $LPXE_1, \ldots, LPXE_M$.

The operation of the FIG. 8 embodiment will be described in detail below.

While the embodiments of FIGS. 3–4 and 6–8 have been illustrated and described with respect to the transmission of voice signals, digital signals can be transmitted and received using the Lincompex compressor and expander illustrated and described in the '217 patent in place of the Lincompex compressors and expanders of FIGS. 3–4 and 6–8.

OPERATION OF THE PRESENT INVENTION

The operation of the embodiments above will now be described. To aid in understanding, it will be assumed for the description of the embodiment of FIG. 3, that the values of M and N are two. Thus, in FIG. 3, the Lincompex compressors $LPXC_1$ and $LPXC_2$ input voice signals $V_1$ and $V_2$, respectively.

Figure 5A:
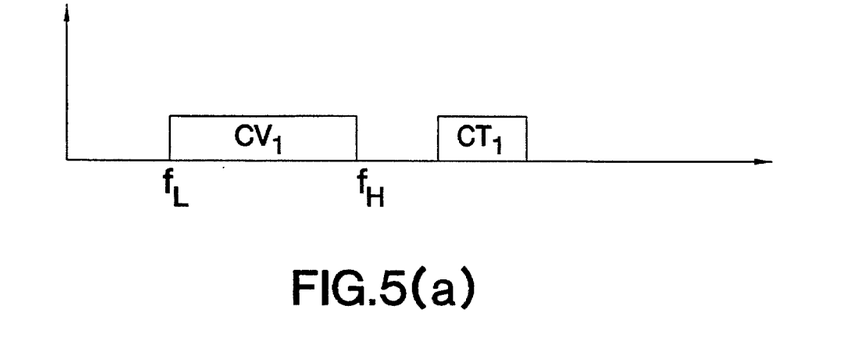
FIGS. 5(a)–(d) illustrate the frequency spectrum of voice signals output from components of the present invention.
Figure 5B:
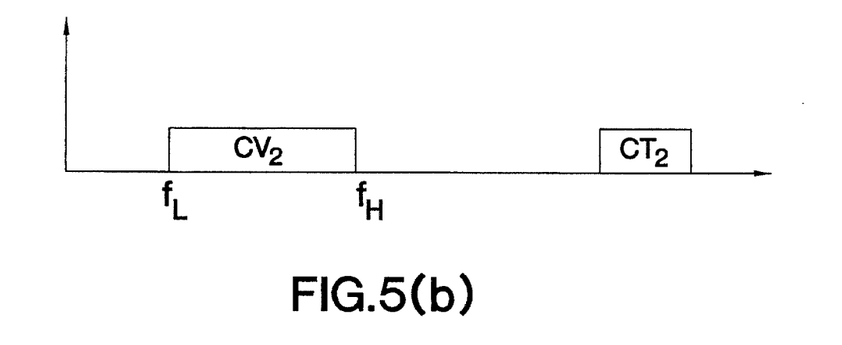

The Lincompex compressor $LPXC_1$ produces a compressed voice signal $CV_1$ and a control tone $CT_1$. The frequency spectrums of the compressed voice signal $CV_1$ and a control tone $CT_1$ are illustrated in FIG. 5(a). The Lincompex compressor $LPXC_2$ produces a compressed voice signal $CV_2$ and a control tone $CT_2$. The frequency spectrums of the compressed voice signal $CV_2$ and a control tone $CT_2$ are illustrated in FIG. 5(b).

Figure 5C:
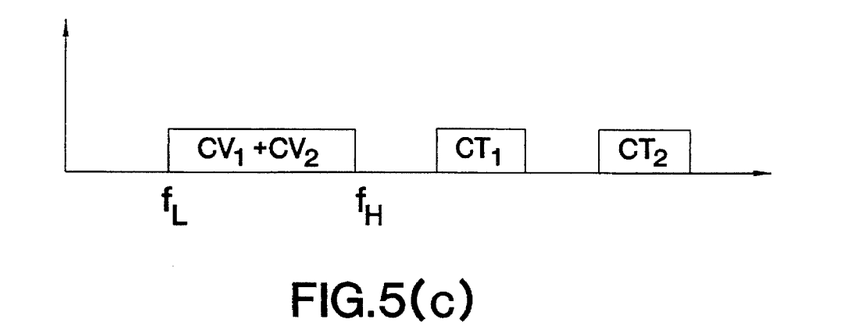

The adder 200 then adds the compressed voice signals $CV_1$ and $CV_2$ and the control tones $CT_1$ and $CT_2$, the result being shown in FIG. 5(c). As FIGS. 5(a)–5(c) illustrate, the compressed voice signals $CV_1$ and $CV_2$ have the same frequency band ($f_L$ to $f_N$), and control tones $CT_1$ and $CT_2$ have different frequency bands which do not overlap one another or the frequency band of the compressed voice signals.

Figure 5D:
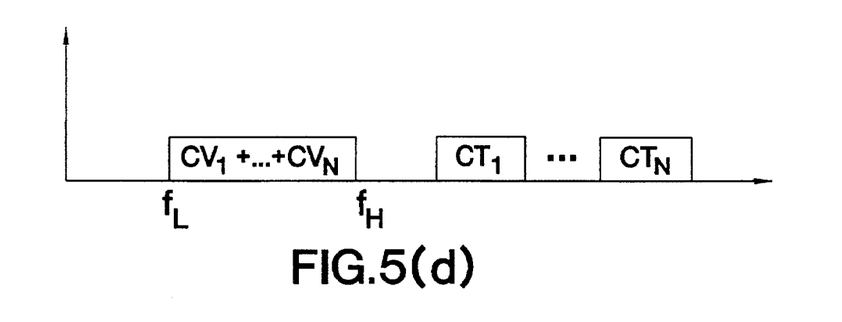

FIG. 5(d) illustrates the frequency spectrums of the compressed voice signals $CV_1, \ldots, CV_N$ and control tones $CT_1, \ldots, CT_N$.

The transmitter 34 transmits the output of the adder 200 on transmission medium 36, and the receiver 38 receives the compressed voice signals $CV_1$ and $CV_2$ and control tones $CT_1$ and $CT_2$ from the transmission medium 36.

Lincompex expanders $LPXE_1$ and $LPXE_2$ (recall that for purposes of illustration only, M is assumed to be 2) input the compressed voice signals $CV_1$ and $CV_2$ and control tones $CT_1$ and $CT_2$ received by the receiver 38. The Lincompex expanders $LPXE_1$ and $LPXE_2$ expand the compressed voice signals $CV_1$ and $CV_2$ according to one of the control tones $CT_1$ and $CT_2$ depending on each band pass filter 46 contained within Lincompex expanders $LPXE_1$ and $LPXE_2$.

For instance, assume that the band pass filter 46 of Lincompex expander $LPXE_1$ only passes the band of $CT_1$. Accordingly, Lincompex expander $LPXE_1$ will expand the compressed voice signals $CV_1$ and $CV_2$ based on the control tone $CT_1$. Since, Lincompex expander $LPXE_1$ expands the compressed voice signals $CV_1$ and $CV_2$ based on the envelope of the voice signal $V_1$, the second compressed voice signal $CV_2$ is treated as noise. The degree of intelligibility of voice signal $V_1$ reproduced by Lincompex expander $LPXE_1$ is high since one voice can be distinguished from others (as in a crowd) even without the additional clarity that $CT_1$ offers by suppressing $CV_2$ in the absence of $V_1$ (i.e., a silent $V_1$).

The pass band of the band pass filter 46 in Lincompex expander $LPXE_2$ can also be set to pass control tone $CT_1$, or could be set to pass control tone $CT_2$. Since Lincompex expander $LPXE_2$ operates in the same manner as Lincompex expander $LPXE_1$ the operation thereof will not be described.

Since the compressed voice signals have the same frequency band, adding the compressed voice signals does not increase the bandwidth of the resulting signal. As demonstrated in the table below, the method of the present invention greatly decreases the transmission bandwidth required for transmitting a plurality of voice signals.

The following table is a comparison of the transmission bandwidth (BW) required for different values of N between a standard single side band system and the present invention.

TABLE

| N | Standard SSB (BW = 2700 Hz * N) | This Method (BW = 2400 Hz + 300 Hz * N) |
|---|---|---|
| 1 | BW = 2700 | BW = 2700 (CV = 300–2700 Hz CT = 300 Hz) |
| 2 | BW = 5400 for 2 channel ISB; otherwise a guard channel of 300 HZ must be included. Thus the non-ISB BW = 5700 | BW = 3000 ($CV_1 + CV_2$ = 300–2700 Hz $CT_1$ = 300 Hz $CT_2$ = 300 Hz) |
| 3 | ISB BW = 8100 Non ISB BW = 8700 | BW = 3300 ($CV_1 + CV_2 + CV_3$ = 300–2700 Hz $CT_1$ = 300 Hz $CT_2$ = 300 Hz $CT_3$ = 300 Hz) |

The bandwidth improvement in decibels (dB) is $$dB = 10 \log \frac{10N-1}{8+N}$$

Accordingly, for a value of N=1, 2, and 3 the improvement in decibels (dB) is 0, 2.79, and 4.21, respectively.

As the number N of information waveforms increases, the signal quality of the signals reproduced by the Lincompex expanders $LPXE_1, \ldots, LPXE_M$ decreases. Accordingly, the number N of information waveforms being transmitted can be set in accordance with desired signal quality.

The operation of the embodiment shown in FIG. 4 is the same as that for FIG. 3 except that a receiver 38 corresponding to each of the Lincompex expanders $LPXE_1, \ldots, LPXE_M$ receives the compressed voice signals and control tones from the transmission medium 36. Each of the receivers 38 outputs the compressed voice signals and control tones to the corresponding one of the Lincompex expanders $LPXE_1, \ldots, LPXE_M$. Since the remainder of the operation of the embodiment of FIG. 4 is as described above with respect to FIG. 3, the description thereof will not be repeated.

The operation of the embodiment of FIG. 6 is similar to that of FIG. 3 described above. Therefore, only the operational differences between FIGS. 3 and 6 will be described.

In FIG. 6, a main LPXC 202 receives the compressed voice signals $CV_1, \ldots, CV_N$ and control tones $CT_1, \ldots, CT_N$ from adder 200. The LPXC 202 treats the compressed voice signals $CV_1, \ldots, CV_N$ and control tones $CT_1, \ldots, CT_N$ as a voice signal and produces a main compressed voice signal and a main control tone.

The transmitter 34 transmits the main compressed voice signal and the main control tone on transmission medium 36. The receiver 38 receives the main compressed voice signal and the main control tone from transmission medium 36.

A main LPXE 204 inputs the main compressed voice signal and the main control tone, and produces the compressed voice signals $CV_1, \ldots, CV_N$ and control tones $CT_1, \ldots, CT_N$. The operation of Lincompex expanders $LPXE_1, \ldots, LPXE_M$ proceeds as discussed above with respect to FIG. 3, and, therefore, will not be repeated here.

The embodiment of FIG. 6 is particularly useful with a large value of N. When the value of N is large and a complex waveform (digital signal) is being transmitted, the high peak-average of the complex waveform will cause problems such as over-modulation. The use of main LPXC 202 and main LPXE 204 as shown in FIG. 6, however, eliminate these problems. It should be noted that in the embodiment of FIG. 6 the above recited table does not apply.

The operation of the embodiment of FIG. 7 is similar to that of FIG. 3 described above. Therefore, only the operational differences between FIGS. 3 and 7 will be described.

In FIG. 7, the output of the adder 200 is received by selector 206. The selector 206 selectively connects switch SW to the input of one of filters $208_1$-$208_N$. The selector 206 may be such that an operator can manually select to which of the inputs of filters $208_1$-$208_N$ the switch SW connects. Alternatively, or in addition to, the selector 206 may be such that an operator can indirectly control (e.g., electrically or magnetically) to which of the inputs of filters $208_1$-$208_N$ the switch SW connects.

As discussed previously, the filters $208_1$-$208_N$ correspond to control tones $CT_1, \ldots, CT_N$, respectively, and filter out the control tones which do not correspond. For instance, filter $208_1$ corresponding to control tone $CT_1$ outputs the compressed voice signals $CV_1, \ldots, CV_N$ and control tone $CT_1$. By controlling switch SW an operator can control which one of the voice signals is available for reproduction by the Lincompex expanders $LPXE_1, \ldots, LPXE_M$.

Alternatively, the selector 206 can include enough filters 208 such that any permutation of control tones are passed. For instance, a filter 208 could be included such that both control tones $CT_1$ and $CT_N$ are passed. Inclusion of these extra filters 208 allows an operator to control whether none, one, some, or all of the voice signals is available for reproduction by the Lincompex expanders $LPXE_1, \ldots, LPXE_M$.

The operation of the embodiment of FIG. 8 is similar to that of FIG. 3 described above. Therefore, only the operational differences between FIGS. 3 and 8 will be described.

In FIG. 8, each of selectors $206_1$-$206_M$ is connected between the receiver 38 and the Lincompex expanders $LPXE_1, \ldots, LPXE_M$. Each selector $206_1$-$206_M$ selectively connects switch SW to the input of one of filters $208_1$-$208_N$ therein. The selectors $206_1$-$206_M$ may be such that an operator can manually select to which of the inputs of filters $208_1$-$208_N$ the switch SW connects. Alternatively, or in addition to, the selectors $206_1$-$206_M$ may be such that an operator can indirectly control (e.g., electrically or magnetically) to which of the inputs of filters $208_1$-$208_N$ the switch SW connects.

As discussed previously, the filters $208_1$-$208_N$ correspond to control tones $CT_1, \ldots, CT_N$, respectively, and filter out the control tones which do not correspond. For instance, filter $208_1$ corresponding to control tone $CT_1$ outputs the compressed voice signals $CV_1, \ldots, CV_N$ and control tone $CT_1$. By controlling switch SW an operator at the receiver 38 or at each of the Lincompex expanders $LPXE_1, \ldots, LPXE_M$ can control which one of the voice signals is available for reproduction by a particular one of the Lincompex expanders $LPXE_1, \ldots, LPXE_M$.

For instance, if an operator at Lincompex expander $LPXE_1$ desires to hear voice signal $V_1$ reproduced, the operator will set switch SW of selector $206_1$ to connect with the input of filter $208_1$. It should be understood in this embodiment that the band pass filters 46 of the Lincompex expanders $LPXE_1, \ldots, LPXE_M$ operate to pass all possible control tones, and only filter out the compressed voice signals $CV_1, \ldots, CV_N$.

Alternatively, as discussed above, the selectors $206_1$-$206_M$ can replace the band pass filters 46 in the Lincompex expanders $LPXE_1, \ldots, LPXE_M$, respectively.

Another variation to the embodiments of the present invention applies to an autobypass operation. As described in the '499 patent, the autobypass operation is where the Lincompex expanders $LPXE_1, \ldots, LPXE_M$ switch out of Lincompex demodulation due to a low signal-to-noise ratio with respect to the control tone. When the signal-to-noise ratio of the control tone is below a certain level, the Lincompex expanders $LPXE_1, \ldots, LPXE_M$ determine, for example, that a non-Lincompex signal (standard transmission) has been received. Accordingly, the received signal is not Lincompex expanded by the Lincompex expanders $LPXE_1, \ldots, LPXE_M$.

Another variation to the embodiments of the present invention applies to an autosilence operation as disclosed in U.S. Pat. No. 4,944,024 (the "'024 patent") issued Jul. 24, 1990, to Leveque, the Inventor of the present application. The '024 application is hereby incorporated by reference. As described in the '024 patent, the effect of random noise fluctuation in the Lincompex expanders $LPXE_1, \ldots, LPXE_M$ is reduced by injecting a small amount of artificial tone into the Lincompex expander circuitry to produce quieting of the system. The frequency of the artificial tone is such that the Lincompex expanders $LPXE_1, \ldots, LPXE_M$ will bias the noise toward a constant quiet level when no meaningful communication signals are being transmitted. The effective level of this artificial tone should be sufficiently small so that at Lincompex transmission and above, (signal at which Lincompex demodulation is acceptable) there is no significant detrimental effect on the recovered signal. The level, however, should be large enough so that below the Lincompex transmission threshold, the biasing effect is produced so that the Lincompex expander self quiets.

While the embodiments of FIGS. 3–4 and 6–8 have been described with respect to the transmission of voice signals, digital signals can be transmitted and received using the Lincompex compressor and expander illustrated and described in the '217 patent.

Furthermore, the present invention is applicable to AM, SSB, FM, etc. systems.

The invention being thus described, it will be obvious that the same may be varied in many ways. Such variations are not to be regarded as departure from the spirit of scope of the invention, and all such modifications would be obvious to one skilled in the art are intended to be included within the scope of the following claims:

I claim:

1. A method for transmitting and receiving information waveforms over a communication medium, comprising the steps of:

(a) modulating a first information waveform according to Lincompex techniques to generate a first compressed information waveform having an information waveform frequency band and a first control tone having a first control tone frequency band;

(b) modulating at least a second information waveform according to Lincompex techniques to generate at least a second compressed information waveform having said information waveform frequency band and a second control tone having a second control tone frequency band;

(c) combining said first compressed information waveform and said first control tone with said second compressed information waveform and said second control tone;

(d) transmitting output of said step (c) on a transmission medium;

(e) receiving output of said step (d) from said transmission medium; and (f) demodulating output of said step (e) according to Lincompex techniques, without preprocessing to establish frame synchronization, using one of said first control tone and said second control tone to recover a respective one of said first information waveform and said second information waveform.

2. The method of claim 1, wherein said step (c) adds said first compressed information waveform and said first control tone to said second compressed information waveform and said second control tone.

3. The method of claim 1, wherein
said step (c) includes the steps of,
 (c1) combining said first compressed information waveform and said first control tone with said second compressed information waveform and said second control tone, and
 (c2) modulating output of step (c1) according to Lincompex techniques to generate a main compressed information waveform and a main control tone; and
said step (e) includes the steps of,
 (e1) receiving said main compressed information waveform and said main control tone which are output from said step (d), and
 (e2) demodulating said main compressed information waveform according to Lincompex techniques using said main control tone to generate said first compressed information waveform, said first control tone, said second compressed information waveform and said second control tone.

4. The method of claim 3, wherein said step (f) includes the steps of:
 (f1) selecting one of said first control tone and said second control tone; and
 (f2) demodulating said output of said step (e2) according to Lincompex techniques using output of said step (f1).

5. The method of claim 1, wherein said step (f) includes the steps of:
 (f1) demodulating said output of said step (e) according to Lincompex techniques using a first Lincompex expander and said first control tone; and
 (f2) demodulating said output of said step (e) according to Lincompex techniques using at least a second Lincompex expander and one of said first control tone and said second control tone.

6. The method of claim 1, wherein said step (c) includes the steps of:
 (c1) combining said first compressed information waveform and said first control tone with said second compressed information waveform and said second control tone; and
 (c2) selecting one of said first control tone and said second control tone;
 (c3) outputting said first compressed information waveform, said second compressed information waveform, and said selected one of said first control tone and said second control tone.

7. The method of claim 6, wherein
said step (c2) selects one of said first and second control tones by filtering output of said step (c1).

8. The method of claim 1, wherein
said step (c) includes the steps of:
 (c1) combining said first compressed information waveform and said first control tone with said second compressed information waveform and said second control tone, and
 (c2) selecting one of said first control tone and said second control tone;
 (c3) modulating said first compressed information waveform, said second compressed information waveform, and said selected one of said first control tone and said second control tone according to Lincompex techniques to generate a main compressed information waveform and a main control tone; and
said step (e) includes the steps of,
 (e1) receiving said main compressed information waveform and said main control tone which are output from said step (d), and
 (e2) demodulating said main compressed information waveform according to Lincompex techniques using said main control tone to generate said first compressed information waveform, said first control tone, said second compressed information waveform and said second control tone.

9. The method of claim 1, wherein said step (f) includes the steps of:
 (f1) selecting one of said first control tone and said second control tone; and
 (f2) demodulating said output of said step (e) according to Lincompex techniques using output of said step (f1).

10. The method of claim 1, wherein said step (b) modulates N information waveforms according to Lincompex techniques to generate N compressed information waveforms having said information waveform frequency band and N control tones having N control tone frequency bands, N being an integer greater than or equal to two.

11. The method of claim 1, wherein said first information waveform and said second information waveform are voice signals.

12. The method of claim 1, wherein said first information waveform and said second information waveform are digital signals.

13. An apparatus for transmitting and receiving information waveforms over a communication medium, comprising:
 a first Lincompex compressor modulating a first information waveform according to Lincompex techniques to generate a first compressed information waveform having an information waveform frequency band and a first control tone having a first control tone frequency band;
 at least a second Lincompex compressor modulating at least a second information waveform according to Lincompex techniques to generate at least a second compressed information waveform having said information waveform frequency band and a second control tone having a second control tone frequency band;
 an arithmetic unit for arithmetically combining said first compressed information waveform and said first control tone with said second compressed information waveform and said second control tone;
 a transmitter transmitting output of said arithmetic unit on a transmission medium;

a receiver receiving output of said transmitter from said transmission medium; and at least one Lincompex expander demodulating output of said receiver according to Lincompex techniques, without preprocessing to establish frame synchronization, using one of said first control tone and said second control tone to recover a respective one of said first information waveform and said second information waveform.

14. The apparatus of claim 13, wherein said arithmetic unit includes an adder which adds said first compressed information waveform and said first control tone to said second compressed information waveform and said second control tone.

15. The apparatus of claim 13, further comprising a main Lincompex compressor, connected between said arithmetic unit and said transmitter, for modulating output from said arithmetic unit according to Lincompex techniques; and a main Lincompex expander, connected between said receiver and said Lincompex expander, for demodulating output from said receiver according to Lincompex techniques.

16. The apparatus of claim 15, further comprising:

a selector, connected between said adder and said main Lincompex expander, which selects one of said first control tone and said second control tone, said selector outputting said selected one of said first control tone and said second control tone, and said combination of said first information waveform and said second information waveform.

17. The apparatus of claim 15, further comprising:

a selector, connected between said main Lincompex expander and each Lincompex expander, which selects one of said first control tone and said second control tone, said selector outputting said selected one of said first control tone and said second control tone, and said combination of said first compressed information waveform and said second compressed information waveform.

18. The apparatus of claim 13, wherein said apparatus comprises:

a first Lincompex expander demodulating output from said receiver according to Lincompex techniques using said first control tone; and at least second Lincompex expander demodulating said output from said receiver according to Lincompex techniques using one of said first control tone and said second control tone.

19. The apparatus of claim 13, further comprising:

a selector, connected between said arithmetic unit and said transmitter, which selects one of said first control tone and said second control tone, said selector outputting said selected one of said first control tone and said second control tone, and said combination of said first compressed information waveform and said second compressed information waveform.

20. The apparatus of claim 13, further comprising:

a selector, connected between said receiver and each Lincompex expander, which selects one of said first control tone and said second control tone, said selector outputting said selected one of said first control tone and said second control tone, and said combination of said first compressed information waveform and said second compressed information waveform.

21. The apparatus of claim 13, wherein said apparatus comprises:

a plurality of Lincompex expanders which demodulate output of said receiver according to Lincompex techniques using one of said first control tone and said second control tone.

22. The apparatus of claim 13, wherein said apparatus comprises:

a plurality of Lincompex compressors, each one of said plurality of Lincompex compressors modulating an information waveform according to Lincompex techniques, said plurality of Lincompex compressors generating a plurality of compressed information waveforms having said information waveform frequency band and a plurality of control tones, each one of said plurality of control tones having a control tone frequency band which differs from control tone frequency bands of other ones of said plurality of control tones; and a plurality of Lincompex expanders which demodulate output of said receiver according to Lincompex techniques using one of said plurality of control tones.

23. The apparatus of claim 22, wherein said apparatus comprises:

a plurality of receivers, each of said plurality of receivers connected to one of said plurality of Lincompex expanders and receiving output of said transmitter from said transmission medium.

24. The apparatus of claim 22, further comprising:

a plurality of selectors, each of said plurality of selectors connected between said receiver and one of said plurality of Lincompex expanders, each of said plurality of selectors selecting one of said plurality of control tones and outputting said selected one of said plurality of control tones and said plurality of information waveforms.

25. The apparatus of claim 13, wherein said first information waveform and said second information waveform are voice signals.

26. The apparatus of claim 13, wherein said first information waveform and said second information waveform are digital signals.

27. A method for transmitting and receiving information waveforms over a communication medium, consisting essentially of:

(a) modulating a first information waveform according to Lincompex techniques to generate a first compressed information waveform having an information waveform frequency band and a first control tone having a first control tone frequency band;

(b) modulating at least a second information waveform according to Lincompex techniques to generate at least a second compressed information waveform having said information waveform frequency band and a second control tone having a second control tone frequency band;

(c) combining said first compressed information waveform and said first control tone with said second information waveform and said second control tone;

(d) transmitting output of said step (c) on a transmission medium;

(e) receiving output of said step (d) from said transmission medium; and (f) demodulating output of said step (e) according to Lincompex techniques, without preprocessing to establish frame synchronization, using one of said first control tone and said second control tone to recover a respective one of said first information waveform and said second information waveform.

28. An apparatus for transmitting and receiving information waveforms over a communication medium, consisting essentially of:

a first Lincompex compressor modulating a first information waveform according to Lincompex techniques to generate a first compressed information waveform having an information waveform frequency band and a first control tone having a first control tone frequency band;

at least a second Lincompex compressor modulating at least a second information waveform according to Lincompex techniques to generate at least a second compressed information waveform having said information waveform frequency band and a second control tone having a second control tone frequency band;

an arithmetic unit for arithmetically combining said first compressed information waveform and said first control tone with said second information waveform and said second control tone;

a transmitter transmitting output of said arithmetic unit on a transmission medium;

a receiver receiving output of said transmitter from said transmission medium; and at least one Lincompex expander demodulating output of said receiver according to Lincompex techniques, without preprocessing to establish frame synchronization, using one of said first control tone and said second control tone to recover a respective one of said first information waveform and said second information waveform.

* * * * *